March 1, 1927. 1,619,319
W. H. THOMAS
FOOT THROTTLE CONTROL
Filed March 31, 1926  2 Sheets-Sheet 1
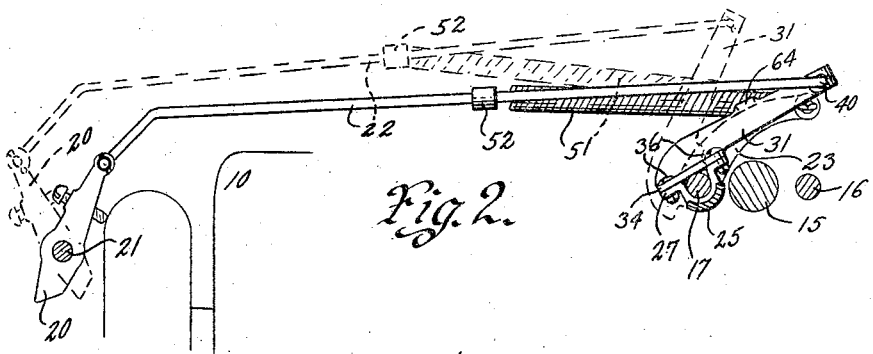
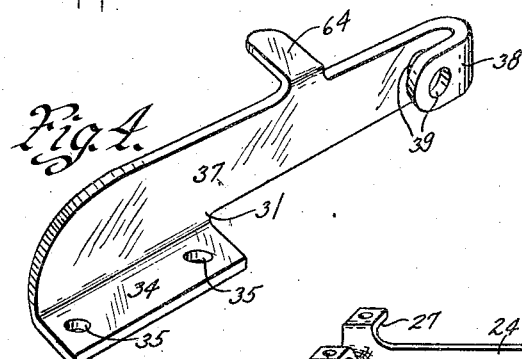
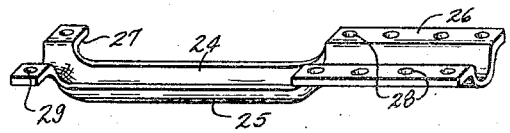
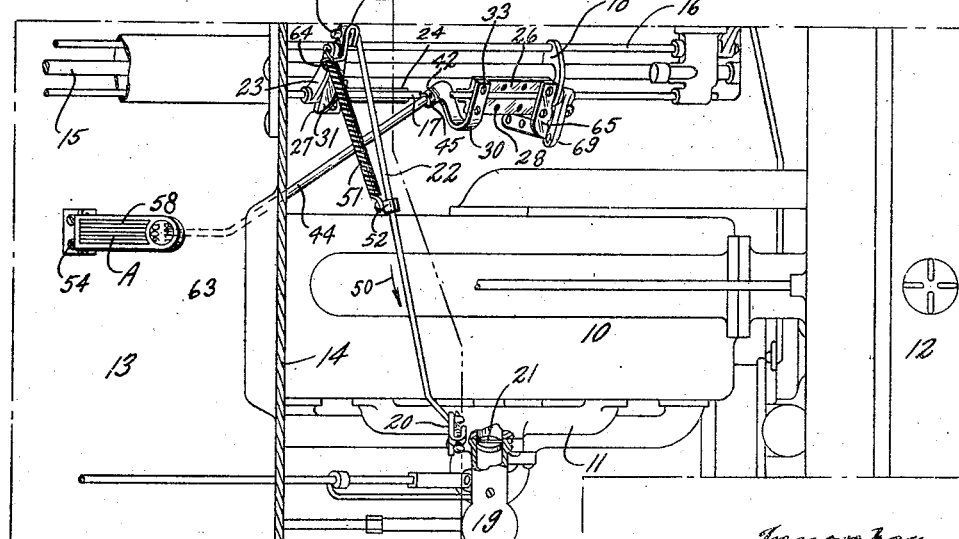

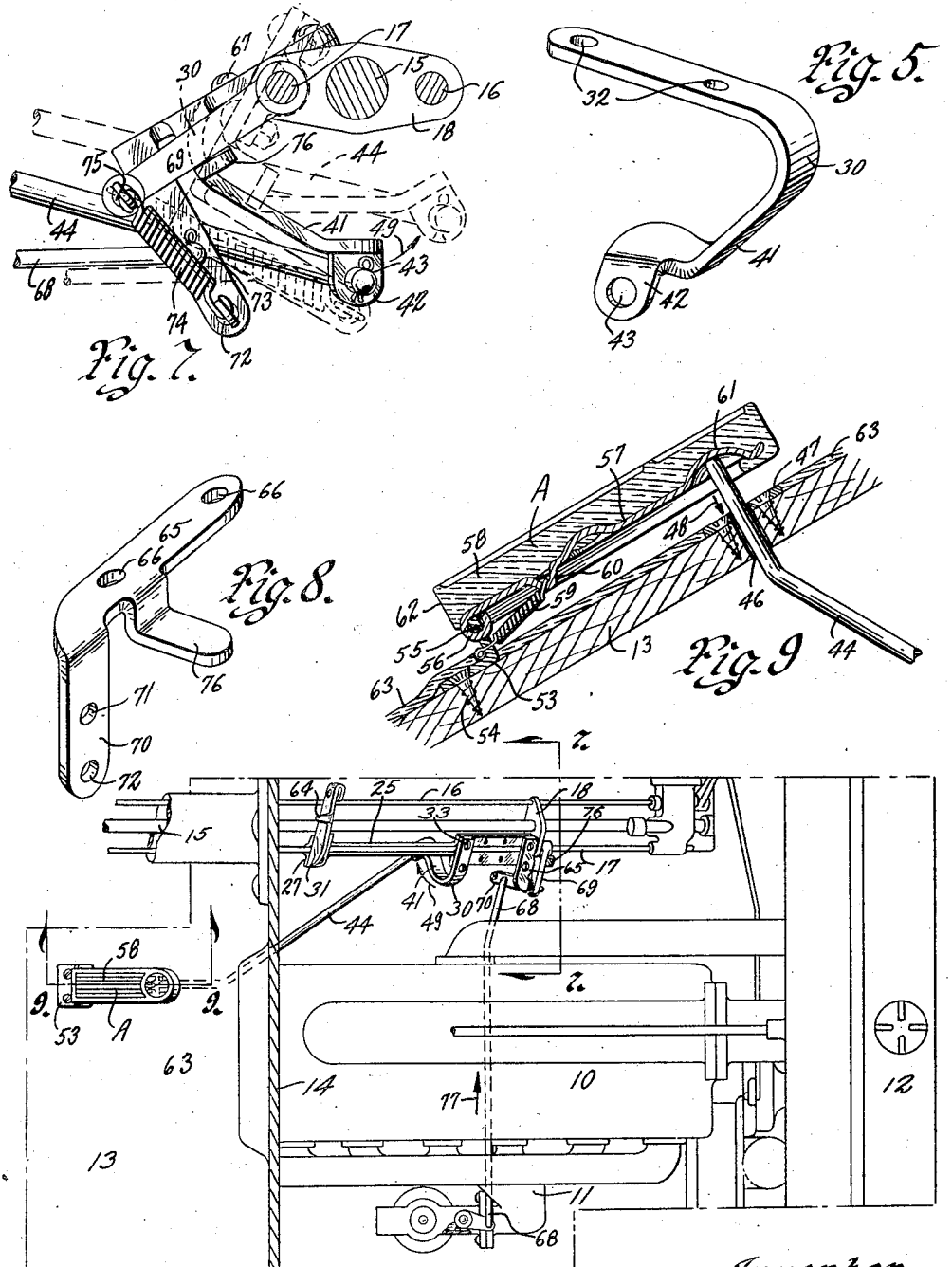

Patented Mar. 1, 1927.

1,619,319

UNITED STATES PATENT OFFICE.

WALTER H. THOMAS, OF SPENCER, IOWA.

FOOT-THROTTLE CONTROL.

Application filed March 31, 1926. Serial No. 98,830.

The object of my invention is to provide a foot throttle control for motor vehicles of simple, durable and comparatively inexpensive construction.

More particularly, it is my object to provide a foot throttle control adapted as an attachment upon automobiles of the Ford type with practically no change or modification of the parts now provided upon such automobiles.

Still a further object is to provide such a device wherein the parts may be readily and quickly installed upon the regular throttle control equipment of the car and the device attached to the carburetor regardless of the type of carburetor employed and regardless of the particular motor of the Ford car.

Still a further object is to provide a fitting adapted to be mounted around the hand throttle control rod of the automobile and capable of being attached to the ordinary connection between the throttle control rod and the carburetor itself in various positions, wherein my foot throttle control may be used upon various styles of the Ford automobile without interfering with the parts normally employed for operating the carburetor by hand.

It may be here mentioned that in some types of carburetors for Ford automobiles, the hand throttle control rod is connected to the carburetor by a link or rod extended through the block of the engine itself, while in other types the connecting link extends over the engine block, and it is my object to provide a foot throttle control capable of being used upon either type of carburetor.

With these and other objects in view, my invention consists in the construction, arrangement and combination of the various parts of my foot throttle control, whereby the objects contemplated are attained, as hereinafter more fully set forth, pointed out in my claims, and illustrated in the accompanying drawings, in which:

Figure 1 is a top, plan view of a portion of an automobile with my improved foot throttle control installed thereon, parts being shown in section to better illustrate the construction thereof.

Figure 2 is a sectional view taken on the line 2—2 of Figure 1, one position of the control being shown in dotted lines.

Figure 3 is a detail, perspective view of the fitting adapted to be mounted upon the hand throttle control rod of the automobile.

Figure 4 is a perspective view of one of the brackets adapted to be secured to the fitting shown in Figure 3.

Figure 5 is a perspective view of a bracket forming a part of my foot throttle mounting.

Figure 6 is a top, plan view of the portion of an automobile illustrating the attachment of my foot throttle control to the carburetor in a form slightly different from that shown in Figure 1 of the drawings.

Figure 7 is a detail, sectional view taken on the line 7—7 of Figure 6.

Figure 8 is a perspective view of a bracket connection; and

Figure 9 is a detail, sectional view through my hinged foot pedal.

In the accompanying drawings, I have used the reference numeral 10 to indicate generally the engine of a Ford automobile having an intake manifold 11, radiator 12, foot board 13 and dash 14. The automobile includes the ordinary steering mechanism or post 15 having mounted on each side thereof a spark control rod 16 and a hand throttle control rod 17. The control rods 16 and 17 and the post 15 are connected together by a plate 18 mounted loosely, so as to permit the operation of the rods 16 and 17.

The type of carburetor shown in Figure 1 of the drawings discloses a connection between the carburetor 19 and the hand throttle control rod 17, which extends over the engine 10. In this type, the carburetor 19 is provided with a throttle stem control lever 20 mounted upon the stem 21. Pivotally connected to the throttle stem control lever 20 is the rod 22, which in turn normally connects to an arm 23 fixed to the hand throttle control rod 17.

Operation of the hand throttle control rod 17 is intended to cause the arm 23 to rotate or swing therewith, which in turn imparts a reciprocating movement to the rod 22 for operating the valve of the carburetor.

My improved foot throttle control is designed to operate the parts just described by the foot.

I provide a fitting 24, which is in the form of a stamping and formed with an elongated channel-shaped connecting member 25, wherein there is provided a lower bearing 26 and an upper bearing 27. The bearings 26 and 27 are channel-shaped so as to extend around the hand throttle control rod 20.

The bearing 26, or the lower bearing as it may be called, is of considerable length and is formed with a plurality of spaced openings 28, which are designed to permit the fitting 24 to be used in connection with various types of automobiles, where the dashes and footboards thereof are spaced at different distances from the front of the automobile.

The upper bearing 27 is formed with a pair of openings 29.

The fitting 24 is held at its upper and lower ends around the throttle control rod 17 by means of a lower fitting 30 and an upper fitting 31 clearly illustrated in Figures 4 and 5 of the drawings. The fittings 30 and 31 are peculiarly shaped so as to permit the parts to properly function, as I will hereinafter more fully set forth.

The fitting 30 is formed with a pair of openings 32 designed to register with any pair of the openings 28 in the lower bearing 26 of the fitting 24. Bolts 33 extend through the registering openings 32 and 28 and serve to hold the lower fitting 30 in position on the fitting 24.

From the construction of the parts just described, it will be seen that the throttle control 17 is encircled by the fitting 24 and the lower fitting 30. The entire fitting 24 rests against the plate 18, and the plate 18 positions the fitting on the throttle control rod 17.

The upper bearing 31 is formed with what may be called a down-turned flange 34, having a pair of openings 35 therein adapted to register with the openings 29 in the upper bearing of the fitting 24. Bolts 36 are designed to be extended through the openings 35 and 29 for holding the upper fitting 31 in position on the fitting 24 and at the same time holding the upper end of the entire fitting 24 around the throttle control rod 17.

From the construction of the parts just described, it will be seen that the fittings 24, 30 and 31 when connected together form an assembly mounted upon the throttle control rod 17.

The throttle control rod 17 is designed to be free to rotate within the bearings in the fitting 24 due to the fact that the bearings are comparatively larger than the diameter of the rod 17.

The fitting 31 is positioned just below the arm 23 normally provided on the throttle control rod 17.

The fitting 31 is formed with a right-angled extension 37 formed integral with the flange 34 and which projects some little distance beyond one edge of the flange 34, all as clearly shown in Figure 4 of the drawings. The end of the right-angled extension 37 furtherest away from the flange 34 is bent upon itself so as to provide a U-shaped end 38, having a pair of registering openings 39.

The openings 39 are spaced some little distance apart, due to the fact that the end of the extension 37 is U-shaped, and it is in these openings 39 that the end of the rod 22 is received. The end of the rod 22 is normally formed with an up-turned portion 40 adapted to coact and be received in an opening formed in the arm 23. The up-turned end 40 extends into the openings 39 in the fitting 31. When my fitting 31 is mounted upon the throttle control rod 17, then the up-turned end 40 is received in the openings 39.

The U-shaped end 38 forms a more substantial bearing than would be formed if simply one opening was provided in a single thickness of the metal of the fitting 31.

Movement of the rod 22 through the fitting 31 operates the valve stem control lever 20 in the manner I will hereinafter more fully describe.

The fitting 30, which serves to hold the lower end of the fitting 24 in position around the hand throttle control rod 17 is formed with a substantially curved portion 41, which extends or curves around and in the back of the fitting 24, as clearly shown in Figures 1 and 6 of the drawings.

The curved end 41 of the fitting 30 has its extreme end bent at right angles and twisted a quarter turn, so as to form the flange 42, which is provided with an opening 43. The opening 43 receives one end of a foot control rod 44. The rod 44 is provided with a suitable collar 45, so as to limit its position relative to the flange 42, and its lower end or the end that is extended through the opening 43 may be provided with a suitable cotter pin or the like.

The foot control rod 44 extends somewhat at an angle relative to the hand throttle control rod 17 and projects up through an opening 46, which is formed in the foot boards 13 of the automobile. A suitable washer or the like 47 may be screwed into the floor boards 13 around the opening 46.

The upper end of the control rod 44 is slightly bent relative to the main body portion of the rod itself.

Movement of the rod 44 in the direction indicated by the arrow 48 will impart movement to the fitting 30 in the direction indicated by the arrow 49, causing the entire fitting or assembly mounted upon the throttle control rod 17 to be rotated.

Rotation of the entire assembly, which is mounted upon the hand throttle control rod 17 will cause the fitting 31 to be moved, imparting a movement to the rod 22 in the direction indicated by the arrow 50.

It will be noted that the entire assembly is free to move independently of the hand throttle control 17, and that through the rod 44 the carburetor valve is operated entirely independent of the hand throttle rod 17.

Secured to the arm 23 on the hand throttle control rod 17 and fastened in the opening normally adapted to receive the upturned end 40 of the rod 22 is a coil spring 51, which is connected at its free end to a collar 52 adjustably mounted upon the rod 22 itself. When the rod 22 is moved in the direction indicated by the arrow 50, then, of course, the spring 51 is placed under a tension, and the spring 51 will tend to cause the entire assembly to be returned to its normal position.

It will be noted that the hand throttle rod 17 does not operate when the assembly mounted thereon is operated, and thus the arm 23 serves as an anchor for one end of the spring 51.

In order to operate the foot control rod 44, I provide a foot pedal construction A. The foot pedal construction A consists of an angular hinge piece 53, which has one part thereof secured to the floor board 13 by the screws or the like 54. The upturned part of the hinge piece 53 is formed with an opening 55. The opening 55 receives the curved end 56 of the pedal plate 57. The pedal plate 57 is formed of a flat piece of metal of greater length than width, and has mounted thereon a rubber foot piece 58, which is pressed on to the plate 57 and held thereon by parts of the plate 57, which are raised and slitted, so that the rubber 58 may be pressed therein and secured thereto.

The rubber 58 also extends around the outer edge of the plate 57, as clearly shown in Figure 9 of the drawings.

From the construction of the parts just described, it will be seen that the foot pedal A is hingedly mounted upon the hinge piece 53 through the looped end 56 and opening 55. The up-turned portion of the hinge piece 53 has anchored to it a small coil spring 59, which has its free end connected to a loop 60 formed in the plate 57.

The spring 59 tends to normally exert a downward pull upon the upper end of the foot pedal A.

The plate 57 is dished as at 61, so as to provide an inverted saucer-shaped portion for receiving the upper end of the rod 44.

The up-turned portion of the hinge piece 53 and the thickness of the pedal A provides what may be called a heel rest or an edge 62 against which the heel of the driver may rest when operating the foot pedal A.

The foot pedal A when pressed downward will cause the rod 44 to operate and in turn the assembly on the control rod 17 will be rotated.

In the installation of my foot pedal, all that is necessary is to cut a slit in the carpet or rubber matting 63, ordinarily covering the floor boards 13, and then secure the hinge piece 53 in position. The carpet or matting 63 may then be placed over the hinge piece 53.

It will be noted that when it is desired to remove the matting or carpet 63, all that is necessary is to simply lift or swing the foot pedal A upon its hinge and raise the carpet thereover. There is no actual physical connection between the foot control rod 44 and the foot pedal A, and this is important in many respects.

It is to be noted that with my foot throttle control, which I have just described, the hand throttle control rod may be operated in the usual manner for controlling the position of the valve of the carburetor.

In order to make the operation of the hand throttle rod 17 effective, I form an up-turned lug 64 on the extension 37 of the fitting 31. The up-turned lug 64 is positioned against the arm 23, so that when the hand throttle rod 17 is rotated in a direction for imparting a swinging movement to the arm 23 in the direction indicated by the arrow 50, then the arm 23 will strike against the lug 64, and cause the entire assembly to be carried therewith for operating the carburetor valve.

It is to be noted that when the arm 23 is used for moving the assembly on the rod 17, that the coil spring 51 is never placed under any tension, because the distance between the collar 52 and the arm 23 remains the same, although when the foot control is employed and the arm 23 remains in its normal position, the spring 51 is then effective.

The parts I have just described are applicable for use in connection with the type of carburetor that now has the rod 22 positioned above the engine 10.

In order to use my foot throttle control upon the type of carburetor wherein the rod between the carburetor and the hand throttle control 17 extends through the engine 10, I employ a lower fitting 65, which is formed with a flat side having a pair of openings 66 therein adapted to register with the two lowermost openings 28 in the fitting 24. The lower fitting 65 is secured to the fitting 24 by means of the bolts 67.

It may be here mentioned that in the type of carburetor and hand control, as shown in Figure 6 of the drawings, the rod 68 connects to an arm 69 mounted on the hand throttle control rod 17.

When my fitting 65 is used, the rod 68 is disconnected from the arm 69. The fitting 65 includes a portion 70 arranged at right angles to the plane in which the portion of the fitting is in that is secured to the fitting 24. This is clearly illustrated in Figures 6 and 8 of the drawings.

The portion 70 is formed with openings 71 and 72. The opening 72 is designed to receive the down-turned end 73 of the rod 68. This is the end that is ordinarily received in an opening formed in the arm 69. The opening 72 in the portion 70 serves as an anchor means for one end of a coil spring 74, which has its other end anchored in the opening 75 formed in the arm 69.

The fitting 65 includes a lug or engaging member 76 adapted to engage the arm 69.

In the operation of this form of foot accelerator, the rod 44 is operated, causing the entire fitting assembly to move in the direction indicated by the arrow 49, in turn moving the rod 68 in the direction indicated by the arrow 77.

It will be noted that the entire assembly on the rod 17 is capable of movement without in any way affecting the rod 17 or the arm 69. The coil spring 74 is so positioned that it is placed under tension, when the assembly on the rod 17 is operated.

When the hand throttle 17 is operated, it will cause the arm 69 to be carried therewith, which in turn through engagement with the lug 76 will cause the assembly on the rod 17 to operate, thereby moving the rod 68 and operating the particular form of carburetor to which it is attached in the ordinary manner.

It will be noted that the assembly upon the hand throttle control rod 17 is adaptable for use in connecting up with operating rods like 22 or 68.

In either case, the same assembly is used with the exception of the fittings 31 and 65. The fitting 31 serves to support the entire assembly at the upper end on the rod 17 and this fitting 31 may be used even though the control rod 68 is fastened to the lower fitting 65.

It will be further noted that my assembly, which is mounted upon the control rod 17, permits me to connect up my foot throttle control to various automobiles wherein different types of carburetors are employed.

The series of openings 28 in the lower portion of the fitting 24 permit the fitting 30 to be mounted in any set of the openings 28, thereby taking care of any variation in distance between the lower portion of the fitting and the floor boards 13, which occur in the various models of automobiles.

No physical connection between the foot pedal and rod 44 makes it easy to remove the floor boards, because the foot pedal is simply removed with the floor boards.

Some changes may be made in the arrangement and construction of the various parts of my foot throttle control, without departing from the essential features and purposes of my invention, and it is my intention to cover by my claims, any modified forms of structure or use of mechanical equivalents, which may be reasonably included within their scope.

I claim as my invention:

1. In combination with a motor vehicle having a carburetor thereon and a hand operable throttle control rod, an arm on the hand throttle control rod and a rod connection between the arm and the carburetor, of a foot operable throttle control including a fitting mounted on the hand throttle control rod adjacent the arm thereon, a part on said fitting adapted to receive one end of the rod connection normally extending between the arm and the carburetor, a projecting lug on said fitting adapted to coact with the arm on the hand throttle control rod, a spring connected to the arm on the hand throttle control rod and to said fitting for holding said projecting lug and arm normally in engagement with each other, whereby operation of the hand throttle control rod will impart operation to said fitting, and means for operating said fitting independently of the hand throttle control rod.

2. In combination with a motor vehicle having a carburetor thereon and a hand operable throttle control rod, an arm on the hand throttle control rod and a rod connection between the arm and the carburetor, of a foot operable throttle control including a fitting mounted on the hand throttle control rod adjacent the arm thereon, a part on said fitting adapted to receive one end of the rod connection normally extending between the arm and the carburetor, a projecting lug on said fitting adapted to coact with the arm on the hand throttle control rod, means for operating said fitting independently of the hand throttle control rod, and a spring connected to the arm on the hand throttle control rod and to said fitting for holding the parts in engagement with each other.

3. In combination with a motor vehicle having a carburetor thereon and a hand operable throttle control rod, an arm on the hand throttle control rod and a rod connection between the arm and the carburetor, of a foot operable throttle control including a fitting mounted on the hand throttle control rod adjacent the arm thereon, said fitting including an upper and lower bearing, an upper and lower fitting mounted on said first fitting, a foot operable rod connected to said lower fitting whereby movement of said rod will impart rotation to all of said fittings, said upper fitting being connected to the rod connection normally extending between the arm and the carburetor, a spring for holding said fitting in engagement with the hand throttle control rod, whereby movement of said fittings will cause said spring to be tensioned, and a projecting lug on said upper fitting adapted to coact with the arm on the hand throttle control rod for limiting the movement of the fittings in one direction on the hand throttle control rod.

4. In combination with a motor vehicle having a carburetor thereon and a hand operable throttle control rod, an arm on the hand throttle control rod and a rod connection between the arm and the carburetor, of a foot operable throttle control including a fitting mounted on the hand throttle control rod adjacent the arm thereon, said fitting including an upper and lower bearing, an upper and lowering fitting mounted on said first fitting, a foot operable rod connected to said lower fitting whereby movement of said rod will impart rotation to all of said fittings, said upper fitting being connected to the rod connection normally extending between the arm and the carburetor, a spring for holding said fitting in engagement with the hand throttle control rod, whereby movement of said fittings will cause said spring to be tensioned, and a projecting lug on said upper fitting adapted to coact with the arm on the hand throttle control rod for limiting the movement of the fittings in one direction on the hand throttle control rod, said lower fitting being adjustable on said first fitting.

5. In combination with a motor vehicle having a carburetor thereon and a hand operable throttle control rod, an arm on the hand throttle control rod and a rod connection between the arm and the carburetor, of a foot operable throttle control including foot actuatable means, a fitting mounted on the hand throttle control rod adjacent the arm thereon, a part on said fitting adapted to receive one end of the rod connection normally extending between the arm and the carburetor and a second part on said fitting operatively connected to said foot actuatable means, a spring connected to said first part for normally holding the parts of said fitting in a normal inactive position relative to the hand throttle rod, whereby operation of the hand throttle rod will carry with it said fitting and said parts without additionally tensioning said spring.

6. In combination with a motor vehicle having a carburetor thereon and a hand operable throttle control rod, an arm on the hand throttle control rod and a rod connection between the arm and the carburetor, of a foot operable throttle control including foot actuatable means, a fitting mounted on the hand throttle control rod adjacent the arm thereon, a part on said fitting adapted to receive one end of the rod connection normally extending between the arm and the carburetor and a second part on said fitting operatively connected to said foot actuatable means, a spring connected to said first part for normally holding the parts of said fitting in a normal inactive position relative to the hand throttle rod, whereby operation of the hand throttle rod will carry with it said fitting and said parts without additionally tensioning said spring, said parts being operable independent of said hand throttle rod against the tension of said spring upon the actuation of said foot actuatable means.

7. In combination with a motor vehicle having a carburetor thereon, a hand operable throttle control rod, an arm on said throttle control rod and a rod connection between the arm and the carburetor of a foot operable throttle control including a fitting mounted on the throttle control rod, a lever on said fitting, a foot actuatable member connected to said lever, a part on said fitting adapted to receive one end of the rod connection normally extending between the arm and the carburetor, said part being spring actuated to engage the throttle control rod whereby rotation of said throttle control rod will carry with it said fitting, lever and part and actuation of said foot actuatable member will move said part and rod connection causing the part to disengage said throttle control rod against the action of the spring.

Des Moines, Iowa, March 26, 1926.

WALTER H. THOMAS.